(12) United States Patent
Tsutsumi et al.

(10) Patent No.: US 10,828,536 B2
(45) Date of Patent: Nov. 10, 2020

(54) SYSTEM COMPRISING BALL WITH EMBEDDED SENSOR

(71) Applicant: Acrodea, Inc., Tokyo (JP)

(72) Inventors: Junya Tsutsumi, Tokyo (JP); Tsuyoshi Ito, Tokyo (JP); Shigeo Fujisaki, Tokyo (JP)

(73) Assignee: Acrodea, Inc., Tokyo (JP)

( * ) Notice: Subject to any disclaimer, the term of this patent is extended or adjusted under 35 U.S.C. 154(b) by 239 days.

(21) Appl. No.: 16/073,438

(22) PCT Filed: Jan. 27, 2017

(86) PCT No.: PCT/JP2017/002864
§ 371 (c)(1),
(2) Date: Dec. 13, 2018

(87) PCT Pub. No.: WO2017/131133
PCT Pub. Date: Aug. 3, 2017

(65) Prior Publication Data
US 2019/0099643 A1    Apr. 4, 2019

(30) Foreign Application Priority Data

Jan. 28, 2016 (JP) ................. 2016-014607

(51) Int. Cl.
*A63B 43/00* (2006.01)
*A63B 69/00* (2006.01)
(Continued)

(52) U.S. Cl.
CPC ................ *A63B 43/00* (2013.01); *A63B 1/00* (2013.01); *A63B 69/00* (2013.01);
(Continued)

(58) Field of Classification Search
None
See application file for complete search history.

(56) References Cited

U.S. PATENT DOCUMENTS 9,032,794 B2    5/2015   Perkins et al.
9,264,897 B2    2/2016   Ge et al.
(Continued)

FOREIGN PATENT DOCUMENTS

JP    2004-264028 A    9/2004
JP    2006-300880 A    10/2006
(Continued)

OTHER PUBLICATIONS

International Search Report for PCT/JP2017/002864 dated Apr. 25. 2017, 2 pages.
(Continued)

*Primary Examiner* — Paul A D'Agostino
(74) *Attorney, Agent, or Firm* — Blank Rome LLP

(57) ABSTRACT

There is provided a system (1) including a ball (10), which incorporates a first sensor that functions as at least a triaxial acceleration sensor, a triaxial gyro sensor, and a triaxial geomagnetic sensor and also includes a first communication unit (16) that wirelessly transmits sensor data detected by the first sensor; and a mobile terminal (20) including a second communication unit (21) that is paired with the first communication unit. The mobile terminal includes: a unit (61) that acquires external information indicating an environment in which the paired ball moves independently; and a unit (63) that generates ball movement data (55) of the paired ball in which the sensor data of the paired ball obtained via the first communication unit and the second communication unit is associated with the external information.

10 Claims, 9 Drawing Sheets

(51) Int. Cl.
*A63B 1/00* (2006.01)
*G01C 19/42* (2006.01)
*G01P 15/08* (2006.01)

(52) U.S. Cl.
CPC .......... *A63B 69/0002* (2013.01); *G01C 19/42* (2013.01); *G01P 15/0802* (2013.01); *A63B 2069/0006* (2013.01); *A63B 2220/40* (2013.01); *A63B 2225/50* (2013.01)

(56) References Cited

U.S. PATENT DOCUMENTS

| | | | |
|---|---|---|---|
| 9,363,661 B2 | 6/2016 | Chan et al. | |
| 9,669,304 B2 | 6/2017 | Mallinson et al. | |
| 9,801,004 B2 | 10/2017 | Liu et al. | |
| 2006/0217921 A1 | 9/2006 | Kourogi et al. | |
| 2008/0052933 A1 | 3/2008 | Yamada | |
| 2011/0283782 A1* | 11/2011 | Pan | A63B 43/00 73/65.03 |
| 2012/0184398 A1* | 7/2012 | Ikka | A63B 69/3685 473/407 |
| 2012/0278023 A1* | 11/2012 | Han | A61B 5/11 702/87 |
| 2013/0073248 A1 | 3/2013 | Perkins et al. | |
| 2013/0274040 A1 | 10/2013 | Coza et al. | |
| 2014/0277636 A1 | 9/2014 | Thurman | |
| 2015/0072811 A1 | 3/2015 | Jolliffe et al. | |
| 2015/0149104 A1* | 5/2015 | Baker | G01R 33/0035 702/87 |

FOREIGN PATENT DOCUMENTS

| | | |
|---|---|---|
| JP | 2013-515999 A | 5/2013 |
| JP | 2013-221942 A | 10/2013 |
| JP | 2014/112222 A | 6/2014 |
| JP | 2014-180576 A | 9/2014 |
| JP | 2014-523553 A | 9/2014 |
| JP | 2015-516852 A | 6/2015 |
| JP | 2015-521429 A | 7/2015 |
| JP | 2015/156095 | 8/2015 |
| JP | 2015/534318 A | 11/2015 |
| WO | WO-2016/007186 A1 | 1/2016 |

OTHER PUBLICATIONS

International Preliminary Report on Patentability and Written Opinion for PCT/JP2017/002864, dated Jul. 31, 2018, 10 pages.

* cited by examiner

Fig. 10

| | TYPE OF PITCH | SPEED | ROTATIONAL SPEED | AXIS OF ROTATION |
|---|---|---|---|---|
| 1 | FASTBALL | FAST | HIGH | PARALLEL TO HORIZONTAL PLANE, DOWNWARD ROTATION IN DIRECTION OF TRAVEL |
| 2 | CURVEBALL | SLOW | QUITE HIGH | INCLINED TO HORIZONTAL PLANE, RIGHTWARD ROTATION IN DIRECTION OF TRAVEL |
| 3 | SHOOTBALL | SLOW | QUITE HIGH | PERPENDICULAR TO HORIZONTAL PLANE, LEFTWARD ROTATION IN DIRECTION OF TRAVEL |
| 4 | FORKBALL | SLOW | LOW | PARALLEL TO HORIZONTAL PLANE, DOWNWARD ROTATION IN DIRECTION OF TRAVEL |
| 5 | SLIDER | QUITE FAST | QUITE HIGH | PERPENDICULAR TO HORIZONTAL PLANE, RIGHTWARD ROTATION IN DIRECTION OF TRAVEL |

SYSTEM COMPRISING BALL WITH EMBEDDED SENSOR

RELATED APPLICATIONS

This application is a national phase of PCT/JP2017/002864, filed on Jan. 27, 2017, which claims the benefit of Japanese Application No. 2016-014607, filed Jan. 28, 2016. The entire contents of these applications are hereby incorporated by reference.

TECHNICAL FIELD

The present invention relates to a system including a ball with a built-in sensor.

BACKGROUND ART

Japanese Laid-open Patent Publication No. 2013-221942 discloses a technology for providing a method of monitoring a ball used during exercise to enable the person doing the exercise to evaluate his/her performance. In this document, a sensor module connected to a ball is used to detect movement of a ball at a first point in time, it is determined whether the movement of the ball corresponds to a predetermined activation movement, the sensor module enters an activated state in response to determination that the movement of the ball corresponds to the predetermined activation movement, and movement of the ball is detected at a second point in time using the sensor module in the activated state.

SUMMARY OF INVENTION

There is a demand for a system that can easily and accurately detect and record the movement of a ball. In order to accurately detect the movement of a ball, it is conceivable to incorporate hardware including a wide variety of sensors. However, in addition to the sensors, it would be necessary to incorporate a control device and batteries for driving the hardware into the ball, which makes it difficult to maintain predetermined performance and functioning as a ball in terms of weight, balance, durability, and the like.

One aspect of the present invention is a system including: a ball, which incorporates a first sensor that functions as at least a triaxial acceleration sensor, a triaxial gyro sensor, and a triaxial geomagnetic sensor and includes a first communication unit that wirelessly transmits sensor data detected by the first sensor; and a mobile terminal including a second communication unit that is paired with the first communication unit. The mobile terminal further includes: a unit that acquires external information indicating an environment in which the paired ball moves independently; and a unit that generates ball movement data of the paired ball in which the sensor data of the paired ball obtained via the first communication unit and the second communication unit is associated with the external information.

One example of a first sensor that includes a triaxial acceleration sensor, a triaxial gyro sensor, and a triaxial geomagnetic sensor is a nine-axis sensor. By incorporating or embedding a nine-axis sensor in the ball, it is possible to accurately detect the movement of the ball itself in the form of the angular velocity, the acceleration, and the rotational state during movement of the ball. On the other hand, although it is desirable to acquire information such as flight direction, flight distance, and flight position to accurately and correctly detect the movement of the ball, from the viewpoints of weight, balance, durability and the like, it is difficult to incorporate sensors and functions for acquiring such information into a ball. In this system, by pairing the ball and the mobile terminal and having the paired mobile terminal acquire external information indicating the environment in which the paired ball moves independently, that is, without extra force being applied by a person (i.e., the user) and combine this information with the sensor data of the paired ball, it is possible to generate ball movement data which makes it possible to reproduce the state in which the paired ball is moving in the air (external world).

Examples of the external information are a movement distance (flight distance), a movement direction (flight direction), a movement start position or a movement end position of the ball, and the like. For a sport in which the position, distance and direction of a thrown ball are set in advance, such as baseball or bowling, the external information includes a throwing distance, a throwing direction, and position information. The mobile terminal is capable of acquiring, automatically using a built-in sensor or through manual input, external information that is necessary to analyze the flight state of the paired ball such as the pitching distance of the paired ball, the pitching direction, the pitching position (catching position), and the like. By combining the external information with sensor data of the paired ball, it is possible to generate ball movement data that makes it possible to analyze the flight state of the ball, either on the spot or at a later time.

The mobile terminal may include a unit that outputs a pitching speed based on acceleration information obtained from the sensor data and the pitching distance included in the external information. The mobile terminal may also include a unit that outputs a rotational speed of the ball based on geomagnetic information obtained from the sensor data. The mobile terminal may also include a unit that calculates, from the geomagnetic information obtained from the sensor data and a geomagnetic inclination angle (an angle of dip) obtained from the position information included in the external information, an angle of an axis of rotation with respect to a horizontal plane and outputs a type of pitch determined based on the pitching speed, the rotational speed, and the angle of the axis of rotation that has been converted to an angle with respect to a direction of travel of the ball according to the pitching direction. Information such as the pitching distance and the pitching direction may be inputted into the mobile terminal by the user or may be automatically measured using a GPS function, an electronic compass function, or the like included in the mobile terminal.

The mobile terminal may include a simulator that displays, based on the ball movement data, a state of the ball during movement when viewed from outside. The mobile terminal may include a unit that analyzes a pitching motion based on the acceleration information and gyro information included in the sensor data or the ball movement data. The nine-axis sensor built into or embedded in the ball is capable of acquiring information relating to an operation (or "pitching motion") of holding and throwing the ball as sensor data and collectively or continuously recording the pitching motion and information during movement (flying) of the ball thrown by the pitching motion.

The mobile terminal may include a unit that stores the ball movement data via the Internet in a cloud server. The mobile terminal may include a unit that outputs information on a comparison with the ball movement data of a user or another person stored in the cloud server.

Another aspect of the present invention is a method of monitoring movement of a ball via a mobile terminal. The ball includes a first sensor, which functions as at least a triaxial acceleration sensor, a triaxial gyro sensor, and a triaxial geomagnetic sensor, and a first communication unit that wirelessly transmits sensor data detected by the first sensor, the mobile terminal includes a second communication unit, and the method includes the following steps.

Pairing the first communication unit of the ball and the second communication unit of the mobile terminal.

The mobile terminal acquiring external information indicating an environment in which the paired ball moves independently.

Generating ball movement data of the paired ball in which the sensor data of the paired ball obtained via the first communication unit and the second communication unit is associated with the external information.

Yet another aspect of the present invention is a program (or "application program" or "program product") that is downloaded into a mobile terminal which includes a second communication unit that is paired with a first communication unit of a ball, the ball incorporating a first sensor, which functions as at least a triaxial acceleration sensor, a triaxial gyro sensor, and a triaxial geomagnetic sensor, and the first communication unit that wirelessly transmits sensor data detected by the first sensor. The program includes instructions that cause the mobile terminal to function as: a unit that acquires external information indicating an environment in which the paired ball moves independently; a unit that generates ball movement data of the paired ball in which the sensor data of the paired ball obtained via the first communication unit and the second communication unit is associated with the external information; and a unit that stores the ball movement data via the Internet in a cloud server.

Yet another aspect of the present invention is a ball including a first sensor that functions as at least a triaxial acceleration sensor, a triaxial gyro sensor, and a triaxial geomagnetic sensor. The ball also includes a first communication unit that wirelessly transmits sensor data detected by the first sensor. The first communication unit is paired with a second communication unit included in a mobile terminal that acquires external information including a distance, a direction, and position information where the ball moves independently, and ball movement data of the paired ball in which the sensor data and the external information are associated is generated.

BRIEF DESCRIPTION OF DRAWINGS

FIG. 10 is a diagram depicting examples of criteria for determining types of pitch.

DESCRIPTION OF EMBODIMENTS

Figure 1:
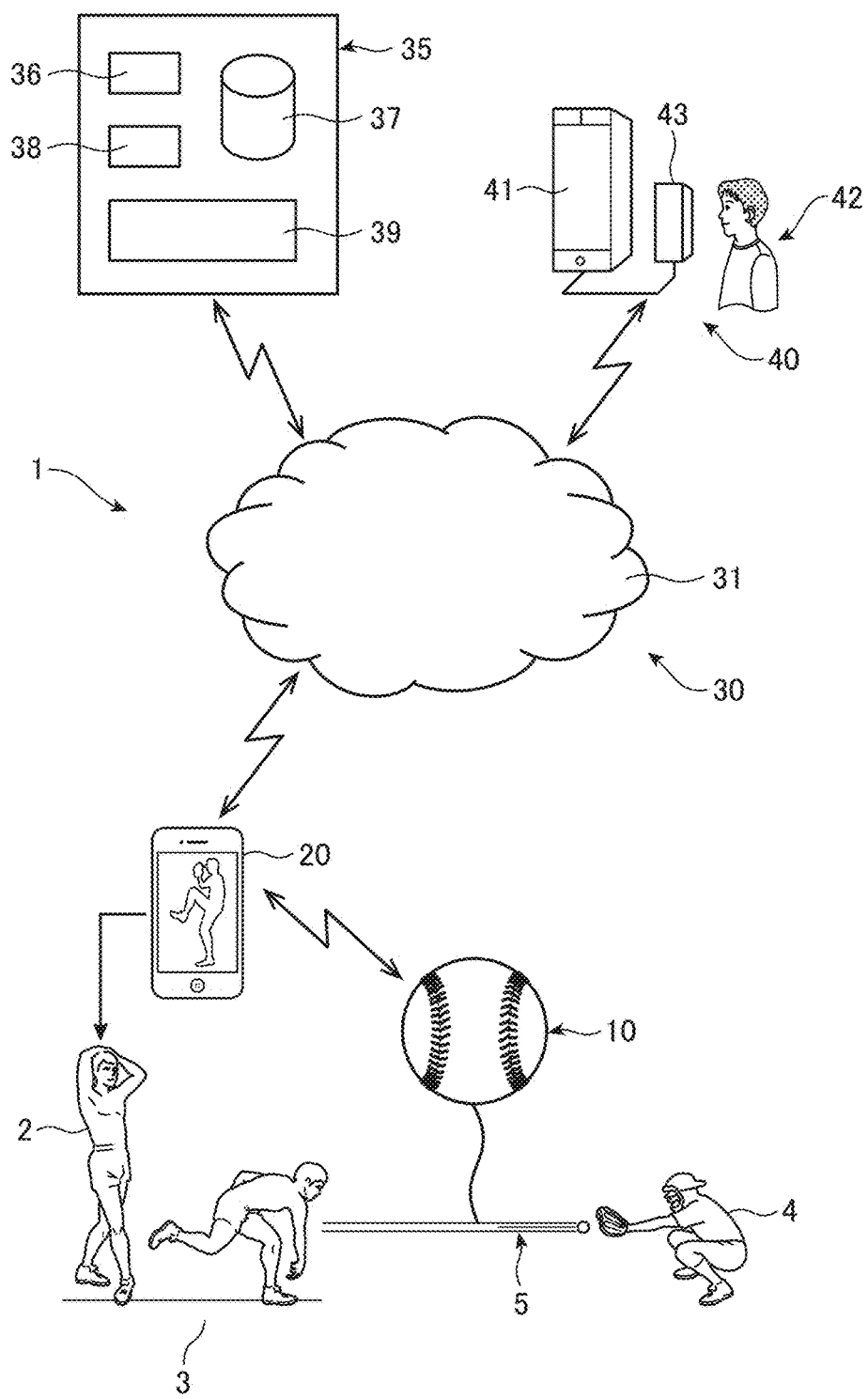
FIG. 1 is a diagram depicting an overview of a system that uses a ball with a built-in sensor.

FIG. 1 depicts an overview of a system that converts a user pitching a ball to data which is then managed via the cloud, as an example of a system including a ball that incorporates a sensor. In this system 1, the state (pitching) 5 of a ball thrown by a user 2 from a mound 3 toward a catcher 4 is converted into data by a sensor built into (embedded in) the ball 10 and is then managed from the cloud 30 via the user's mobile terminal 20. The cloud 30 includes a computer network 31 such as the Internet, a server 35 that is connected to the computer network 31, and an online coaching system 40 connected to the computer network 31.

The server (or "cloud server") 35 includes a user management function 36, storage 37 that stores data for each user, a data management unit 38, and a data analysis unit 39 for performing data collection and ranking and the like. The online coaching system 40 includes a simulator 41 that reproduces a user's pitching using the data for each user stored in the server 35 and a unit that enables a coach 42 to send advice via the computer network 31 regarding the user's pitching that has been reproduced.

Figure 2:
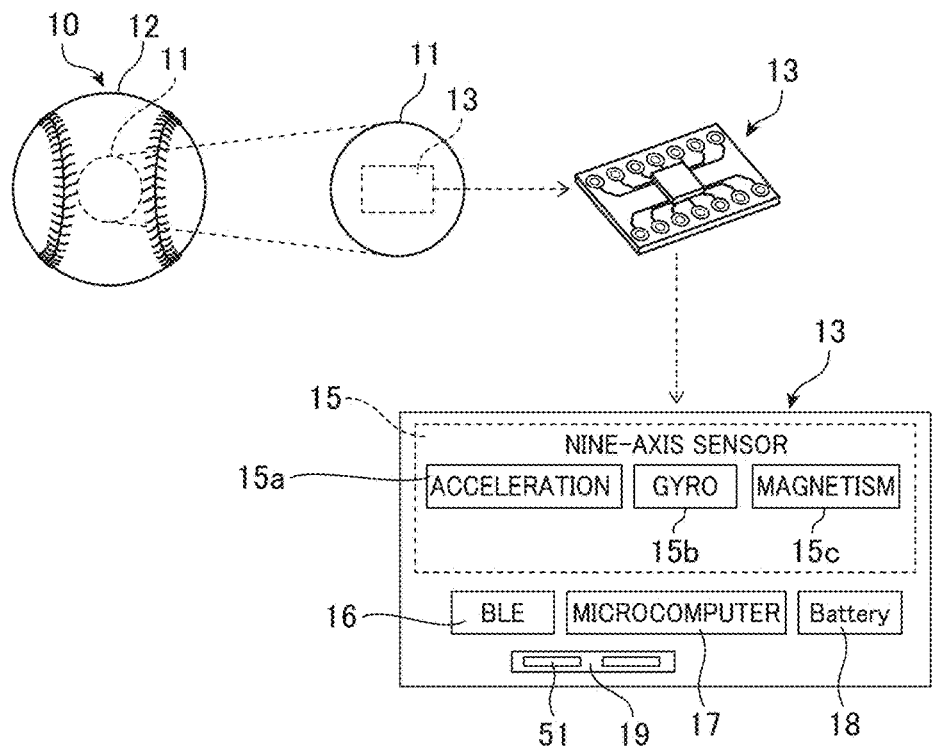
FIG. 2 is a diagram depicting the overall configuration of the ball with a built-in sensor.

FIG. 2 depicts an example of a ball 10 with a built-in sensor. One example of the ball 10 is a baseball. The ball 10 includes a center core 11 made of rubber or cork in which the hardware 13 is housed and a leather outer casing 12 wrapped around the core 11 in the same way as a regular baseball. By housing the hardware 13 in the core 11, it is possible to provide the ball 10 where inclusion of the hardware 13 does not cause misalignment or at least any significant misalignment of the core. Although the hardware 13 is housed inside the core 11, the ball 10 with the built-in sensor (embedded sensor) is configured so that its overall weight and balance are the same or little different to a regular baseball.

The hardware 13 includes a nine-axis sensor 15, a short-range wireless communication unit (or "first communication unit", for one example BLE (Bluetooth (registered trademark) Low Energy)) 16, a microcomputer 17 for control purposes, a battery 18, and a memory 19. In the present embodiment, the configuration of the hardware 13 is simplified as much as possible in order to keep the weight and balance of the ball 10 with a built-in sensor substantially the same as those of a conventional ball, so that the battery 18 is built-in and a disposable type. If a function for indirectly charging the battery, wirelessly or via another method, can be made compact and lightweight enough to house inside the core 11, it is also possible to provide a ball with a built-in sensor that is not disposable.

The nine-axis sensor 15 includes a triaxial acceleration sensor 15a, a triaxial gyro sensor 15b, and a triaxial geomagnetic (magnetic) sensor 15c. Although it is possible to house an acceleration sensor, a gyro sensor, and a geomagnetic sensor as separate components, in order to make the hardware 13 compact and lightweight, it is desirable to use a nine-axis sensor 15 where these sensor functions are integrated into a single chip. When measurement starts, the microcomputer 17 stores data (sensor data) 51 detected by the nine-axis sensor 15, that is, acceleration in three axial directions, angular velocity in three axial directions, and geomagnetism in three axial directions in the memory 19 with a predetermined sampling pitch. When measurement ends, the microcomputer 17 outputs the stored sensor data 51 via the wireless communication unit 16.

Figure 3:
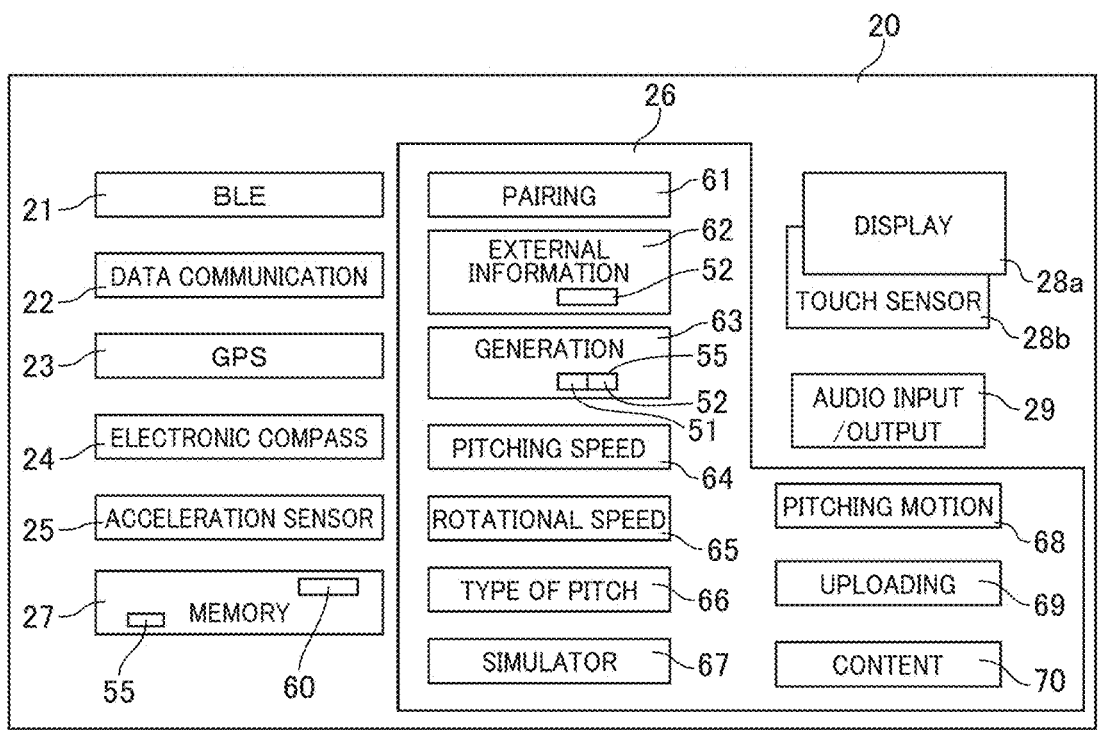
FIG. 3 is a diagram depicting the overall functions implemented in a mobile terminal to be paired with the ball with a built-in sensor.

FIG. 3 depicts the configuration of the mobile terminal 20. An example of the mobile terminal 20 is a smartphone, which includes a short-range wireless communication unit (or "second communication unit", for example, BLE (Bluetooth (registered trademark) Low Energy)) 21, a data communication unit 22 that transmits and receives data via a wireless LAN and/or a mobile telephone communication network, a GPS 23 that measures latitude and longitude, an electronic compass 24 that can determine direction, an acceleration sensor 25, a processor 26 that realizes various functions, a memory 27, and a display 28a, a touch sensor 28b, and an audio input/output unit 29 that are input/output units.

In accordance with instructions included in an application program (or "application", "program", or "program product") 60 that has been downloaded into the memory 27, the processor 26 provides functions as a terminal for generating ball movement data and/or a terminal for analyzing the behavior (flight state) of the ball. According to the program 60, the processor 26 functions as a unit 61 for pairing the communication unit (or "first communication unit") 16 built into the ball 10 and the communication unit (or "second communication unit") 21 of the mobile terminal 20, a unit 62 that acquires external information 52 indicating the environment in which the ball 10 that has been paired moves independently, and a unit 63 that associates or connects sensor data 51 of the paired ball 10 obtained through the communication units 16 and 21 with the external information 52 to generate ball movement data 55 for the paired ball 10.

According to instructions included in the application program 60, the processor 26 also functions as a unit 64 that outputs the pitching speed of the ball 10, a unit 65 that outputs the rotational speed of the ball 10, a unit 66 that outputs a type of pitch based on the angle of the axis of rotation, pitching speed, and rotational speed of the ball 10, a simulator 67 for displaying the state of the ball 10 during movement in a state where the ball is viewed from outside, a unit 68 that analyzes the pitching motion, a unit 69 that stores (uploads) the ball movement data 55, in which the sensor data 51 and the external information 52 have been combined, via the Internet 31 into the cloud server 35, and a unit 70 that displays content supplied from the cloud server 35.

FIG. 4(a) depicts an example of the sensor data 51. The vertical axis represents intensity and the horizontal axis represents the timing of data sampling, which corresponds to elapsed time. The dot-dot-dash line indicates data (acceleration data) 57 on a certain axis of the triaxial acceleration sensor 15a, the dot-dash line indicates data (gyro data) 58 on a certain axis of the triaxial gyro sensor 15b, and the solid line indicates data (geomagnetic data) 59 on a certain axis of the geomagnetism (magnetic) sensor 15c.

The sensor data 51 includes all of the data detected by the nine-axis sensor 15 from the time the user (pitcher) 2 starts a pitching motion until the ball 10 leaves the hand of the pitcher 2 and settles in the mitt of the catcher 4. The sensor data 51 may also include all of the data detected by the nine-axis sensor 15 when the ball 10 is thrown back from the catcher 4 to the pitcher 2.

A first part 51a of the sensor data 51 is a part related to a pitching motion 71. In the first part 51a of the sensor data 51, the influence on the nine-axis sensor 15 of the ball 10 due to the pitching motion 71 from the wind-up, cocking, acceleration, and release, as depicted in FIG. 4(b), appears. Accordingly, by analyzing the first part 51a of the sensor data 51, it is possible to analyze the pitching motion 71 of the user 2. During the pitching motion 71, there are large fluctuations in the acceleration data 57 and the gyro data 58, and it can be understood that the ball 10 has been released due to the acceleration in the direction of travel disappearing at the moment 51c where the ball is released.

The part 51b from the releasing of the ball 10 until the ball settles in the catcher's mitt is a part where the ball 10 is independently flying (moving). The moment 51d at which the ball 10 settles into the catcher's mitt can be determined from a sudden change in the acceleration data 57 and the rotation of the ball 10 stopping in the geomagnetism data 59. Rotation of the ball 10 can be detected from the amplitude of the geomagnetism data 59.

Figure 5:
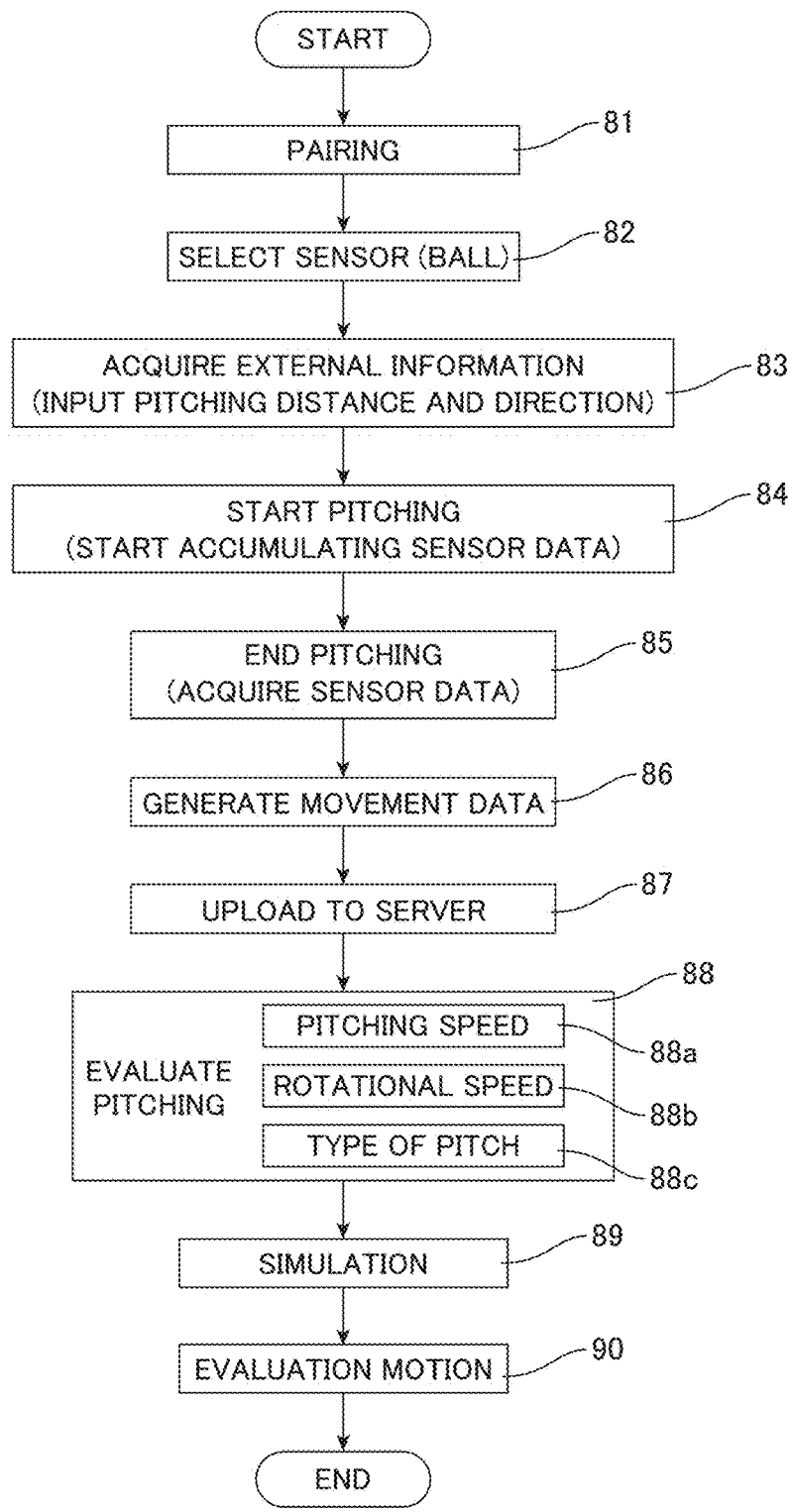
FIG. 5 is a flowchart depicting an overview of processing by an application of a mobile terminal.

FIG. 5 depicts, by way of a flowchart, an overview of a process (or "method") where the application 60 is launched, the sensor data 51 is acquired by the mobile terminal 20 from the ball 10 that has been paired, the ball movement data 55 of the paired ball 10 is generated, and the movement of the paired ball 10 is analyzed. In step 81, the ball 10 with a built-in (embedded) sensor and the mobile terminal 20 are paired. More specifically, the pairing unit 61 of the mobile terminal 20 pairs the first communication unit 16 incorporated in the ball 10 and the second communication unit 21 of the mobile terminal 20. By doing so, a specified ball 10 and a specified mobile terminal 20 are uniquely matched, and the external information 52 inputted into the paired mobile terminal 20 is associated on a one-to-one basis with the sensor data 51 of the paired ball 10. A plurality of balls 10 can be paired with one mobile terminal 20, and in that case, the ball 10 to be pitched is selected out of the paired balls 10 in step 82.

Figure 6:
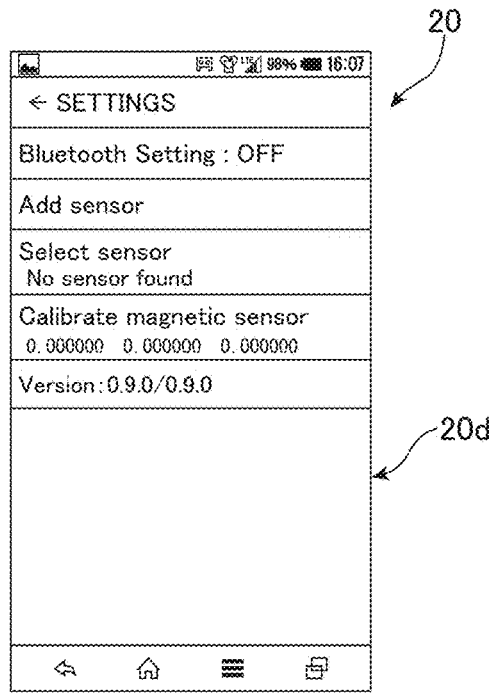
FIG. 6 is an example of a screen when pairing a mobile terminal and a ball.

FIG. 6 depicts one example of a screen 20d for pairing a ball 10 at the mobile terminal 20. By turning on a "communication setting" (in the present embodiment, Bluetooth (registered trademark)) in the screen 20d and clicking "Add Sensor", an ID and password are exchanged with a ball 10 with a built-in sensor to start the pairing process. The microcomputer 17 incorporated in (embedded in) the ball 10 may set the built-in first communication unit 16 in a state where pairing can be performed continuously or periodically, or the microcomputer 17 may detect a predetermined action performed on the ball 10 using the nine-axis sensor 15 and then cause the first communication unit 16 to enter a pairing state.

An operation (action) that causes a switch to the communication mode is preferably an action which can be detected by the nine-axis sensor 15 and is not related to a pitching motion of the ball 10. As examples, the operation that causes a switch to the communication mode may be performed by bouncing the ball a predetermined number of times within a predetermined period, by continuing to bounce the ball until pairing is completed, by swinging the ball 10 a predetermined number of times within a predetermined period, by rotating the ball 10 a predetermined number of times within a predetermined period, or a combination of these operations. By detecting these actions the microcomputer 17 may turn the first communication unit 16 on or off or may change the operation frequency of the nine-axis sensor 15 so as to switch modes to minimize consumption of the battery 18 built into the ball 10.

Figure 7:
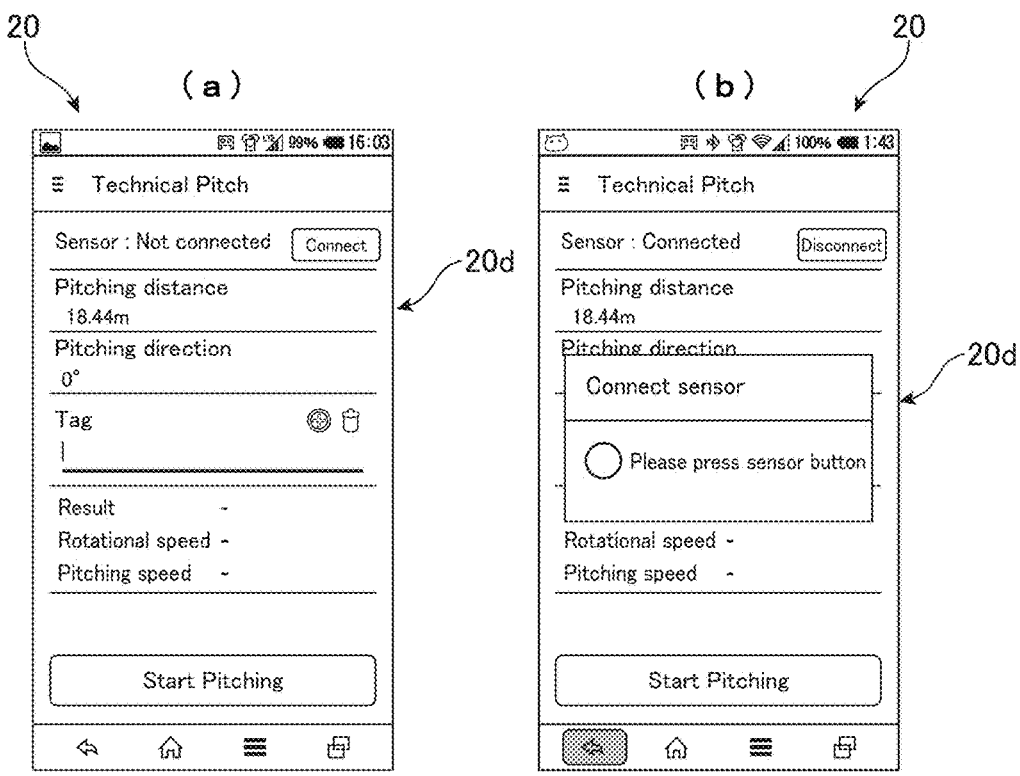
FIG. 7 is an example of screens for selecting a ball with a built-in sensor at a mobile terminal and inputting external information.

FIGS. 7(a) and 7(b) depict one example of a screen 20d for selecting a paired ball 10. When a plurality of balls 10 have been paired with one mobile terminal 20, as depicted in FIG. 6, after selecting a plurality of balls displayed in a selection column for the balls (sensors) 10 on the screen 20d, the user selects "Connect" on the screen 20d in FIG. 7(a). When a screen giving instructions for an operation of the ball (sensor) 10 appears as depicted in FIG. 7(b), a state is produced where the user can press a button on a ball (sensor) 10 by performing a predetermined action on the ball 10, for example, by bouncing the ball 10. By doing so, the ball (sensor) 10 to be paired in order to generate the ball movement data 55 is selected, and effectively paired with the mobile terminal 20.

Returning to FIG. 5, once the relationship between the mobile terminal 20 and the ball 10 is set at one-to-one by pairing, in step 83, external information 52 indicating the environment in which the ball 10 is independently moving is acquired. In this example, as depicted in FIG. 7(a), the unit 62 for acquiring external information displays a region where the user 2 manually inputs "pitching distance" and "pitching direction" as the external information 52 on the screen 20d of the mobile terminal 20. The unit 62 for acquiring the external information additionally acquires "latitude and longitude" as position information of the external information 52 from the GPS 23 of the mobile terminal 20. The position information relating to pitching may be the pitching position (mound), the catching position (home plate), or a position in between, and additionally may be a position that does not largely deviate from the flight path of the ball 10. The "pitching direction" may be automatically acquired by the unit 62 by displaying the orientation in which the mobile terminal 20 is facing using the electronic compass 24 of the mobile terminal 20 and having the user match the orientation of the mobile terminal 20 and the pitching direction.

When the external information 52 has been set in the mobile terminal 20, in step 84, the user clicks the "Start pitching" button on the screen 20d shown in FIG. 7(a). By performing this operation, a command to acquire the sensor data 51 and start storing in the memory is transmitted from the mobile terminal 20 via the second communication unit 21 and the first communication unit 16 to the paired ball 10. Further, the displaying of "Start pitching" on the screen 20d of the mobile terminal 20 depicted in FIG. 7(a) changes to "End pitching".

Upon completion of pitching, in step 85, the user 2 clicks "End pitching" (not illustrated) on the screen 20d of the mobile terminal 20. By performing this operation, a command to end the acquisition of sensor data 51 is transmitted from the mobile terminal 20 via the second communication unit 21 and the first communication unit 16 to the paired ball 10. At the same time, a command to transmit the sensor data 51 stored in the memory 19 to the mobile terminal 20 is transmitted, and the generating unit 63, which is a function implemented in the mobile terminal 20 by the application program 60, acquires the sensor data 51 from the ball 10. Note that in the following description, functions implemented by the application program (program product) 60 will be described as functions of the mobile terminal 20.

In step 86, the generating unit 63 of the mobile terminal 20 associates the sensor data 51 acquired from the ball 10 with the external information 52 inputted into the mobile terminal 20 to generate the ball movement data (or "movement data") 55 of the paired ball 10. The sensor data 51 includes acceleration data 57 in three axial directions, gyro (angular velocity) data 58 in three axial directions, and geomagnetic data 59 in three axial directions. The external information 52 includes a pitching distance that the ball 10 moves, that is, the distance from the mound 3 to the catcher 4, the pitching direction, and latitude and longitude information. The ball movement data 55 may include the sensor data 51 as raw data or may include the sensor data 51 as data that has been normalized or standardized according to the external information 52.

The sensor data 51 is information (internal information) that can be acquired inside the ball 10 by the nine-axis sensor 15, and is the information required for reproducing the movement of the ball 10 itself. However, the sensor data 51 is merely information on the ball 10 itself, and it is not possible to reproduce how the ball 10 moves relative to the outside world (external world, in the air), for example, relative to the ground. In order to reproduce the movement of the ball 10 relative to the outside world, information such as the pitching distance, the pitching direction, and the latitude and longitude information is necessary, and such information cannot be obtained by the nine-axis sensor 15. Although it is possible that some of the external information 52 could be obtained by incorporating GPS into the ball 10, it is not possible to incorporate GPS without changing the size and weight of the ball 10, especially for a baseball. The power that would be consumed by GPS would also be a problem.

In this system 1, the ball 10 and the mobile terminal 20 are paired, the external information 52 is acquired using the mobile terminal 20, and the obtained external information 52 is combined with the sensor data 51 of the paired ball 10 to generate the movement data 55, thereby avoiding the above problem. By improving the performance of the mobile terminal 20, it is possible to improve the accuracy of the obtained external information 52, to improve the analysis accuracy and speed for the obtained sensor data 51 or the generated movement data 55, and to expand the range in which such data can be used. This means that by updating the application program 60, it is possible to add on functions to the services that use the ball 10 with the built-in sensor and to improve the quality of the services.

In step 87, the upload unit 69 of the mobile terminal 20 uploads the movement data 55 via the data communication unit 22 to the cloud server 35. The movement data 55 according to the present embodiment directly includes the external information 52 for analyzing pitching and raw data acquired from the nine-axis sensor 15 as the sensor data 51. Accordingly, by uploading the movement data 55 to the cloud server 35, it is possible to analyze the movement data 55 according to various methods and to use the movement data 55 in a variety of applications. In addition, when there have been advances in the method of analysis, it is also possible to reanalyze the movement data 55 using an advanced method.

At the mobile terminal 20, in addition to uploading the movement data 55, it is possible in step 88 to evaluate the pitching on the spot (at the site) based on the information obtained by the sensor data 51 and the external information 52. The pitching may be analyzed and evaluated based on the movement data 55, which includes the sensor data 51 and the external information 52 and has been stored in the memory 27, but it is also possible to analyze and evaluate the pitching based on the sensor data 51 and the external information 52 obtained at that time. An example content of the evaluation are "pitching speed", "rotational speed" and "result" (that is, type of pitch), which are displayed on the screen 20d in FIG. 7(a). Accordingly, the evaluating step 88 includes a step 88a of finding (calculating) the pitching speed, a step 88b of finding (calculating) the rotational speed, and a step 88c of finding (calculating) the type of pitch.

In step 88a that finds the pitching speed, the unit 64 for calculating the pitching speed calculates the pitching speed (speed) Pv using the distance Pd and the movement time (flight time) Pt according to the following Expression (1). In the case of professional baseball, 18.44 m, which is the distance from the mound 3 to the catcher 4, is inputted as the pitching distance Pd in the external information 52.

$$Pv=Pd/Pt \quad (1)$$

Figure 4:
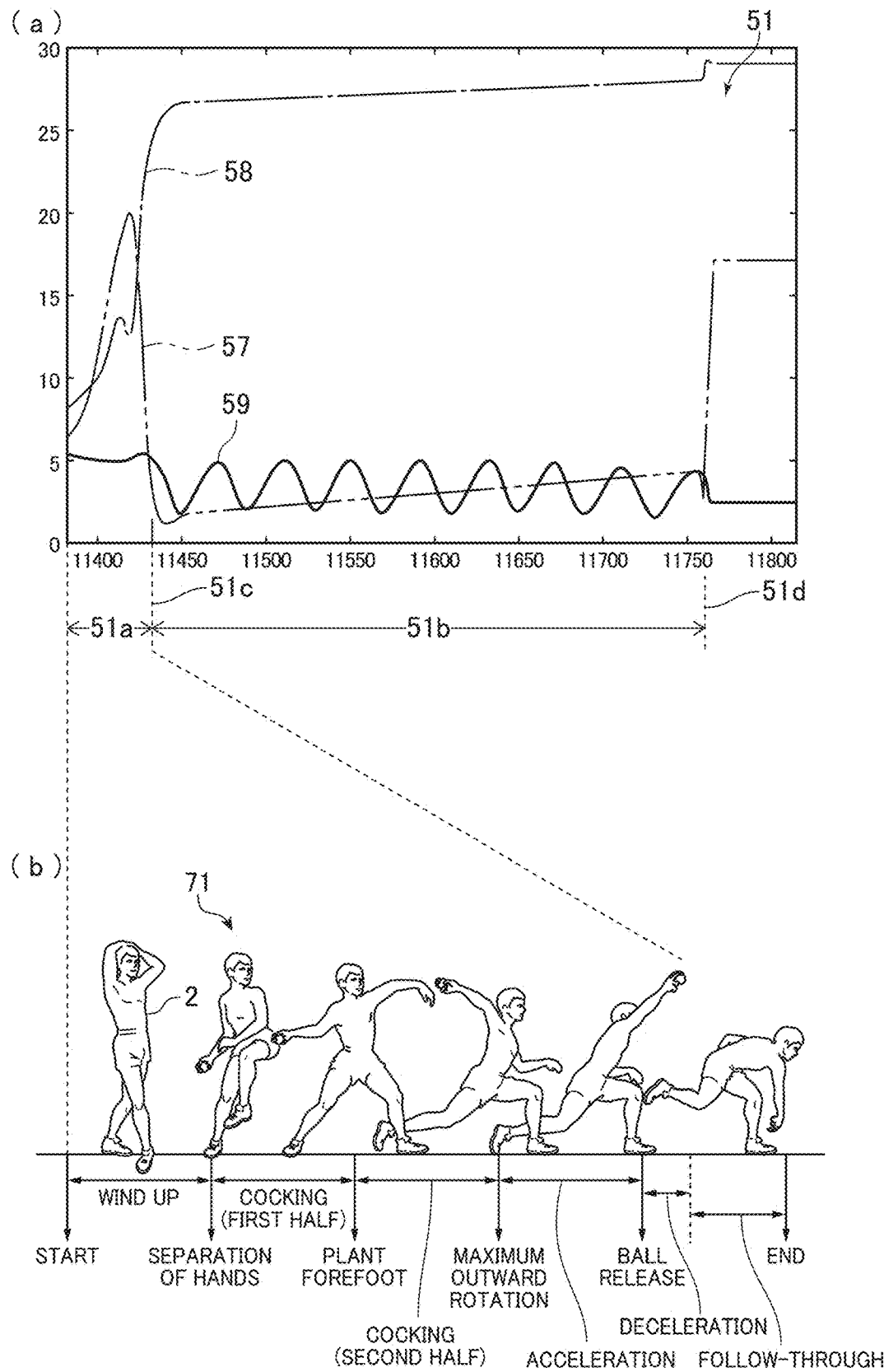
FIG. 4(a) depicts one example of sensor data acquired from the nine-axis sensor incorporated in a ball and FIG. 4(b) depicts a pitching motion, wherein the data of the pitching motion is included in a first part of the sensor data.

The movement time Pt is the time (i.e., the number of samples) from the releasing of the ball 10 until the ball settles in the catcher's mitt, and as depicted in FIG. 4(*a*), can be calculated from the sensor data 51 by principally detecting changes in acceleration.

In step 88b that finds the rotational speed, the unit 65 for calculating the rotational speed determines how much (i.e., how many times) the ball 10 has rotated during the movement period. More specifically, the rotational speed Pr is calculated from the number of cycles (oscillations) of the geomagnetism data 59 in the sensor data 51. Although it is not possible to acquire the rotational speed Pr when the ball 10 rotates perpendicularly to the earth's magnetism, this case hardly ever occurs when measuring pitching by a pitcher.

In step 88c that finds the pitch type, the unit 66 for calculating the pitch type calculates the angle at which the ball 10 is rotating with respect to the horizontal plane and the direction of travel of the ball 10. That is, it is necessary to establish the direction (angle) the axis (axis of rotation) around which the ball 10 is rotating, with respect to the direction Pdir in which the ball 10 is thrown. The throwing direction (pitching direction) Pdir is inputted in advance as the external information 52. A geomagnetic inclination angle (an angle of dip) is required to calculate the angle of the rotation axis of the ball 10 with respect to the horizontal plane. In this embodiment, the inclination angle is calculated from a relative relationship with the gravity vector, and the inclination angle is further calculated from the position information (the latitude and longitude). The position information (latitude and longitude information) is acquired as the external information 52. Note that it is assumed that the magnitude of the geomagnetism is substantially constant.

In an xyz coordinate system, a rotational axis vector R123 for three points X1, X2, and X3 that belong to a rotational plane is as follows. First, the coordinates of the three points X1, X2 and X3 are defined as follows.

$$X1=(x1,y1,z1)$$

$$X2=(x2,y2,z2)$$

$$X3=(x3,y3,z3) \quad (2)$$

When two vectors (X1→X2) and (X1→X3) are expressed as X12 and X13, X12 and X13 are defined as follows.

$$X12=(x2-x1,y2-y1,z2-z1)=(x12,y12,z12)$$

$$X13=(x3-x1,y3-y1,z3-z1)=(x13,y13,z13) \quad (3)$$

The vector (rotational axis vector) R123 that is perpendicular to these vectors X12 and X13 is defined as follows.

$$R123=(y12\times z13-z12\times y13, z12\times x13-x12\times z13, x12\times y13-y12\times x13) \quad (4)$$

Figure 8:
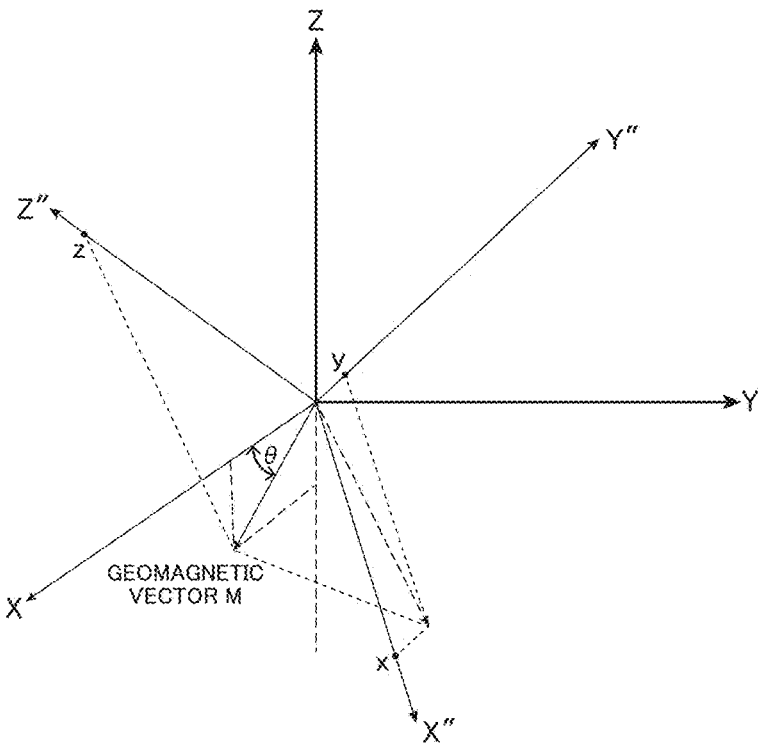
FIG. 8 is a diagram depicting the relationship between a surface coordinate system and a sensor coordinate system.

The angle of the rotational axis is converted from the sensor coordinate system to the earth coordinate system (ground coordinate system, external coordinate system). As depicted in FIG. 8, consider a case where the XYZ coordinate system (ground coordinate system) is rotated by α, β, γ to match a X" Y" Z" coordinate system (which is the sensor coordinate system). Since the geomagnetic vector is the same for both coordinate systems, the following Relational Expression (5) holds.

$$\begin{pmatrix} x \\ y \\ z \end{pmatrix} = \begin{pmatrix} \cos\gamma & \sin\gamma & 0 \\ -\sin\gamma & \cos\gamma & 0 \\ 0 & 0 & 1 \end{pmatrix} \begin{pmatrix} \cos\beta & 0 & -\sin\beta \\ 0 & 1 & 0 \\ \sin\beta & 0 & \cos\beta \end{pmatrix} \begin{pmatrix} 1 & 0 & 0 \\ 0 & \cos\alpha & \sin\alpha \\ 0 & -\sin\alpha & \cos\alpha \end{pmatrix} \begin{pmatrix} X \\ Y \\ Z \end{pmatrix} \quad (5)$$

The geomagnetism vector M is as given below with m as the magnitude of the geomagnetism and θ as the inclination angle. This is the same as the sensor values (x, y, z).

$$M=(m\times\cos\theta, 0, -m\times\sin\theta) \quad (6)$$

Accordingly, substituting the following Condition (7) into Expression (5) gives Expression (8) for the rotation angles α, β, γ.

$$X=m\times\cos\theta, Y=0, Z=-m\times\sin\theta \quad (7)$$

$$\cos\theta\times\cos\beta\times\cos\gamma - \sin\theta\times\sin\alpha\times\sin\gamma + \sin\theta\times\cos\alpha\times\sin\beta\times\cos\gamma = x/m$$

$$-\cos\theta\times\cos\beta\times\sin\gamma - \sin\theta\times\sin\alpha\times\cos\gamma - \sin\theta\times\cos\alpha\times\sin\beta\times\sin\gamma = y/m$$

$$\cos\theta\times\sin\beta - \sin\theta\times\cos\alpha\times\cos\beta = z/m$$

where $m=(x^2+y^2+z^2)^{1/2}$ \quad (8)

This means that when rotated by α, β, γ, the ground coordinate system XYZ and the sensor coordinate system X" Y" Z" (the coordinate system xyz) are converted by the following Expression (9).

$$\begin{pmatrix} X \\ Y \\ Z \end{pmatrix} = \begin{pmatrix} 1 & 0 & 0 \\ 0 & \cos\alpha & -\sin\alpha \\ 0 & \sin\alpha & \cos\alpha \end{pmatrix} \begin{pmatrix} \cos\beta & 0 & \sin\beta \\ 0 & 1 & 0 \\ -\sin\beta & 0 & \cos\beta \end{pmatrix} \begin{pmatrix} \cos\gamma & -\sin\gamma & 0 \\ \sin\gamma & \cos\gamma & 0 \\ 0 & 0 & 1 \end{pmatrix} \begin{pmatrix} x \\ y \\ z \end{pmatrix} \quad (9)$$

Figure 9:
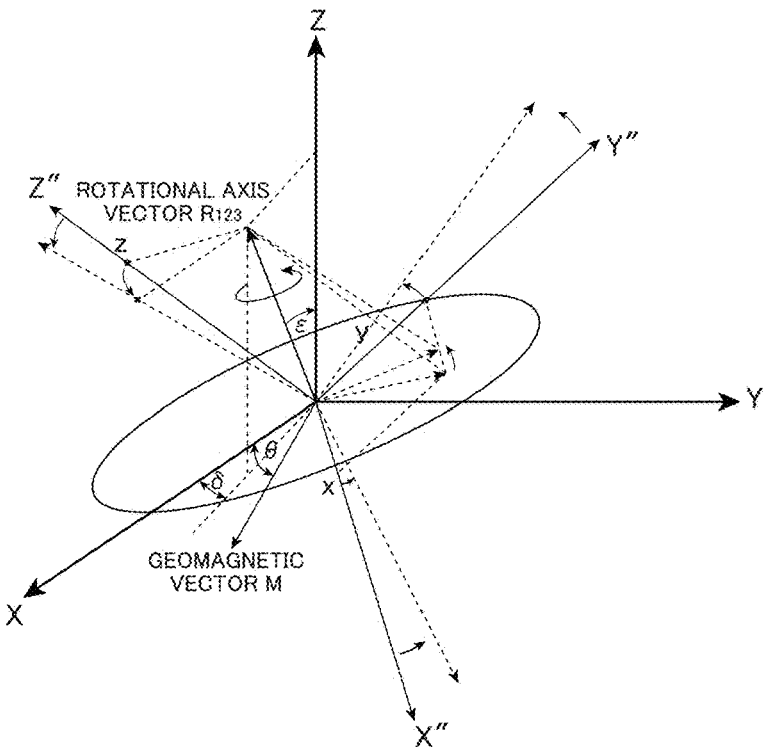
FIG. 9 is a diagram depicting the relationship between a surface coordinate system of the axis of rotation and a sensor coordinate system.

Accordingly, as depicted in FIG. 9, the coordinates (RX, RY, RZ) of the rotational axis vector R123 in the ground coordinate system are calculated from the coordinates (x, y, z) of the rotation axis vector R123 in the sensor coordinate system using Expression (9). That is, the coordinates (X, Y, Z) in Expression (9) may be replaced with the coordinates (RX, RY, RZ).

An azimuth angle δ from the X axis (northward) and an inclination E from the Z axis (zenith direction) of the rotation axis are calculated by the following expression.

$$\cos\delta = RX/(RX^2+RY^2)^{1/2}$$

$$\cos\varepsilon = RZ/(RX^2+RY^2+RZ^2)^{1/2} \quad (10)$$

In addition, the angle δ3 where the angle of the rotational axis is viewed from a position facing the direction (pitching direction) Pdir in which the ball 10 is moving (traveling, direction of travel) is calculated. Assuming that the pitching direction (angle) Pdir is an angle with north as a reference, the angle δ3 of the rotational axis is found by the following expression.

$$\delta 3 = \delta + Pdir \quad (11)$$

The pitch type determination unit 66 specifies the type of pitch for the pitched ball 10 from the pitching speed Pv, the rotational speed Pr, and angle of the rotational axis angle (δ3, ε). The determination criteria are collectively depicted in FIG. 10. The pitch type can be specified by defining ranges for the ball speed (speed) Pv, the rotational speed Pr, and the angle of the rotational axis (δ3, ε). In addition, since the pitch type changes according to whether the user is right-handed or left-handed, it is desirable for such information to also be included in the external information 52.

Figure 11:
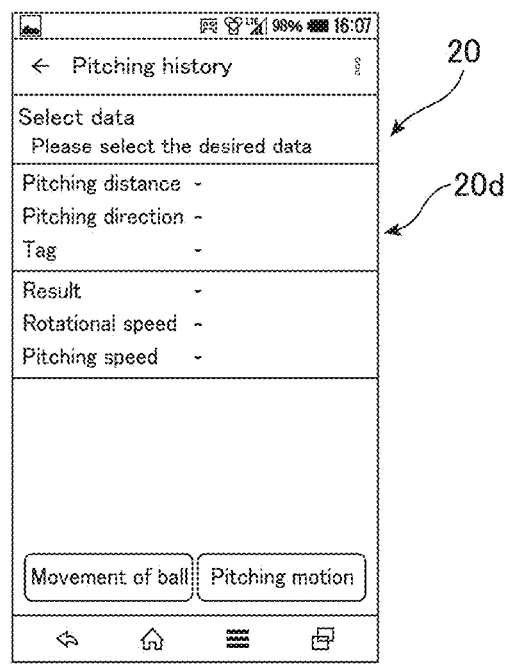
FIG. 11 is an example of a screen that analyzes data and depicts results, such as type of pitch.

In step 88 that evaluates pitching, it is possible not only to evaluate the immediately preceding pitch, but to also evaluate pitches stored in the mobile terminal 20 and/or to download data of previous pitching from the cloud server 35 and evaluate pitching with the same processing as described above. As depicted in FIG. 11, it is possible to "select data" from the "pitching history" displayed on the mobile terminal 20 and output the ball speed, the rotational speed, and the pitch type based on this data. In the application 60 installed in the mobile terminal 20, the sensor data 51 acquired from the paired ball 10 is combined with the pitching information (external information) 52 at that time to generate the ball movement data 55 of the paired ball 10 which is stored in the mobile terminal 20 and/or uploaded to the cloud server 35. Accordingly, it is possible to equally evaluate sensor data 51 in which the pitching location differs and/or the pitching direction differs.

Figure 12:
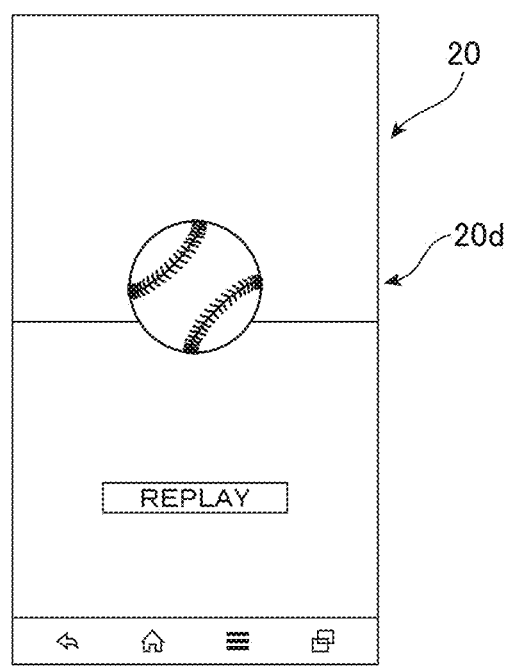
FIG. 12 is an example output of a simulator.

In addition, when "Movement of Ball" is selected on the screen 20d depicted in FIG. 11, the simulator 67 is activated at the mobile terminal 20. In step 89, based on the ball movement data 55, the simulator 67 simulates and displays the movement of the ball 10 when seen from the outside of the ball 10 by way of images like that depicted in FIG. 12. The movement data 55 includes sensor data 51 which is information from inside the ball 10 and external information 52 which is information from outside the ball 10, and makes it possible to reproduce the flight state, flight path, and the like of the ball 10. This means that the simulator 67 can reproduce the movement of the ball 10 when seen from outside the ball 10. In addition, since the sensor data 51 relates to the movement of the ball 10 and includes data on three axes, rather than being limited to movement when looking from a specified direction like video footage, it is possible to reproduce the movement when looking from any direction in the ground coordinate system. The simulator 67 is not limited to using the movement data 55 stored in the mobile terminal 20 but can also use movement data 55 downloaded from the cloud server 35.

Figure 13:
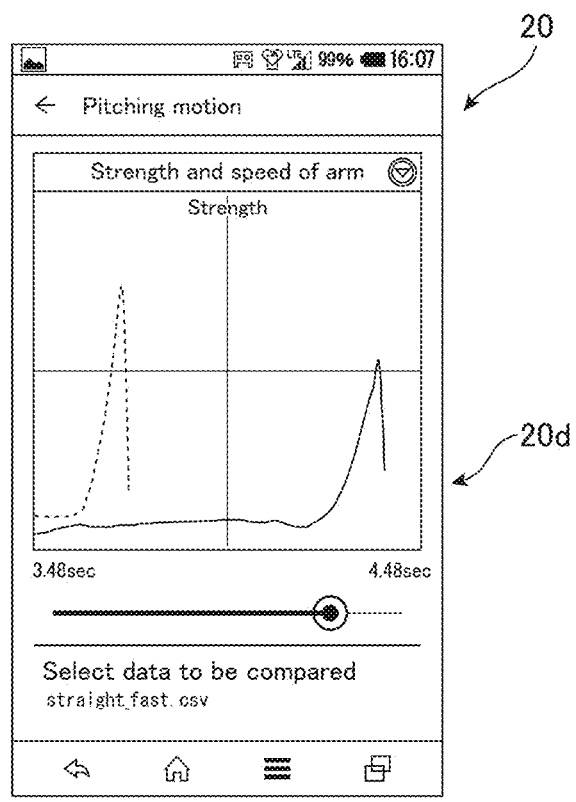
FIG. 13 is an example of a screen that displays an analysis result for pitching motion.

When "pitching motion" is selected on the screen 20d depicted in FIG. 11, the unit 68 that analyzes the pitching motion is operated, and in step 90, information on the first part 51a in the sensor data 51 depicted in FIG. 4 is used to evaluate the pitching motion. FIG. 13 depicts the result (solid line) of analyzing the first part 51a of the sensor data 51 of the ball 10 pitched by the user 2 for the strength and speed of the arm movement and, as a comparative example, the result (broken line) of analyzing the movement strength and speed of the pitching motion of a professional baseball player.

As the pitching motion, it is possible to capture the stopped period when the pitcher sets up, to capture the application of acceleration to the ball 10 in the direction of travel immediately before the ball 10 is thrown (the time of release), and by using the triaxial gyro data 58, to analyze posture information in the first part 51a as the movement during the motion.

In addition, the application 60 (the mobile terminal 20) includes a unit 70 for supplying content. This unit 70 provides the result of analysis of the movement data 55 for each user collected on the cloud server 35, data collection and ranking results for all users, comparison results with pitching by professional baseball players, and the like to the user 2 via the mobile terminal 20.

In this system 1, the ball 10 with the built-in embedded sensor and the mobile terminal 20 that have been paired are used to store the movement data 55 of the ball 10 via the cloud 30 in the server 35. Accordingly, it is possible to provide each user, via the cloud 30, with content that includes information about data collection for the user, a reference function (registration of best pitches), pitching analysis, analysis of strengths and weaknesses (habits), comparisons with pitching by professional players, and the like. As specific examples, it is possible to set, for each user, the kind of pitching (type of pitch) the user is aiming for via numerical targets, to set a target pitch type and indicate the differences with the target ball in speed and/or rotational speed, to compare and display, for individual pitches, a model for each pitching type, for example, differences with a pitch and/or pitching form of a professional pitcher for the target type of pitch as percentages, and/or to display user's own history or progress record (for one month or one year) in the form of a graph.

Data collection and ranking may be performed for rotational speed, pitching speed, deviation for breaking ball pitches, and the like. When permitted by the user 2, the uploaded movement data 55 can be automatically collected for ranking purposes so that the user can confirm the position of his/her pitching among all users. The result can be displayed on the mobile terminal 20 of each user as ranking results of best pitches on a daily, weekly, or monthly basis, for example. When highest values of the rotational speed and pitching speed have been measured, it is possible to automatically register a best pitch and set such pitch as data to be compared with the pitching of other users. Also, separately from normal rankings, it is possible for the application 60 to provide promotions where sponsors are recruited and special periods are set up for events or the like and users compete in the rankings for prizes, such as signed balls.

In addition, by having various types of professional baseball pitchers throw various types of pitches using the system 1, it is possible to construct a database that makes it possible to compare with pitching of amateur pitchers or under-developing players. Accordingly, by using the system 1, it is possible to provide services that compare a user's own pitching with the pitching of professional pitchers, in order to improve the ability of users on a variety of levels or simply for fun. This system 1 can provide similar services not only for pitchers but also for fielders.

It is also possible to provide fee-based services (or "online coaching") where former professional players provide advice to individual users based on the movement data 55 accumulated in the cloud server 35 to give pitching guidance, to enhance the strengths of the user 2, and work on his/her weaknesses (habits). The advice from former professional baseball players can be directly received and advice on creating a practice menu can also be obtained. Since the movement data 55 also includes data relating to the pitching motion, it is possible to analyze pitching motion with a professional eye based on the movement data 55 and/or to add a pitching video and have former professionals give advice based on the movement data 55 and the video. The content of the advice may include timing for releasing the ball, pitching technique (such as how to cause rotation and apply force), and guidance on practical training methods (such as strength training and stretching).

Note that although a baseball with a built-in sensor has been described above as an example, the ball may be a baseball for use in regular (hard-ball) or soft-ball baseball, or may be a softball ball. In addition, it is also possible to incorporate a nine-axis sensor in balls for other sports, such as a bowling ball and a golf ball. For a golf ball, it is possible for example to use a ball for putting practice where the impact applied to the ball is low.

The invention claimed is:

1. A system comprising:
a ball that incorporates a first sensor, which functions as at least a triaxial acceleration sensor, a triaxial gyro sensor, and a triaxial geomagnetic sensor, and includes a first communication unit that wirelessly transmits sensor data detected by the first sensor; and
a mobile terminal including a second communication unit that is paired with the first communication unit,
wherein the mobile terminal further includes:
a unit that acquires external information indicating an environment in which the paired ball moves independently; and
a unit that generates ball movement data of the paired ball in which the sensor data of the paired ball obtained via the first communication unit and the second communication unit is associated with the external information,
wherein the external information includes a pitching distance, a pitching direction, and position information;
and wherein the mobile terminal includes:
a unit that outputs a pitching speed based on acceleration information obtained from the sensor data and the pitching distance;
a unit that outputs a rotational speed of the ball based on geomagnetic information obtained from the sensor data; and
a unit that calculates, from the geomagnetic information and a geomagnetic inclination angle obtained from the position information, an angle of an axis of rotation with respect to a horizontal plane and outputs a type of pitch determined based on the pitching speed, the rotational speed, and the angle of the axis of rotation that has been converted to an angle with respect to a direction of travel of the ball according to the pitching direction.

2. The system according to claim 1,
wherein the first sensor is a nine-axis sensor.

3. The system according to claim 1,
wherein the mobile terminal includes a simulator that displays, based on the ball movement data, a state of the ball during movement when viewed from outside.

4. The system according to claim 1,
wherein the mobile terminal includes a unit that analyzes a pitching motion based on acceleration information and gyro information included in the sensor data.

5. The system according to claim 1,
wherein the mobile terminal includes a unit that stores the ball movement data via the Internet in a cloud server.

6. The system according to claim 5,
wherein the mobile terminal includes a unit that outputs information on a comparison with the ball movement data of a user or another person stored in the cloud server.

7. A method of monitoring movement of a ball via a mobile terminal,
the ball including a first sensor that functions as at least a triaxial acceleration sensor, a triaxial gyro sensor, and a triaxial geomagnetic sensor and a first communication unit that wirelessly transmits sensor data detected by the first sensor,
the mobile terminal including a second communication unit,
and the method comprising:
pairing the first communication unit of the ball and the second communication unit of the mobile terminal;
acquiring, by the mobile terminal, external information indicating an environment in which the paired ball moves independently; and
generating ball movement data of the paired ball in which the sensor data of the paired ball obtained via the first communication unit and the second communication unit is associated with the external information;
wherein the external information includes a pitching distance, a pitching direction, and position information,
and the method further comprises:
calculating, in the mobile terminal, a pitching speed based on acceleration information obtained from the sensor data and the pitching distance;
calculating a rotational speed of the ball based on geomagnetic information obtained from the sensor data; and
calculating, from the geomagnetic information and a geomagnetic inclination angle obtained from the position information, an angle of an axis of rotation with respect to a horizontal plane and calculating a type of pitch determined based on the pitching speed, the rotational speed, and the angle of the axis of rotation that has been converted to an angle with respect to a direction of travel of the ball according to the pitching direction.

8. The method according to claim 7,
further comprising displaying, by the mobile terminal, based on the ball movement data, a state of the ball during movement when viewed from outside.

9. A program product that is downloaded into a mobile terminal which includes a second communication unit that is paired with a first communication unit of a ball, the ball incorporating a first sensor that functions as at least a triaxial acceleration sensor, a triaxial gyro sensor, and a triaxial geomagnetic sensor and the first communication unit that wirelessly transmits sensor data detected by the first sensor,
the program comprising instructions that cause the mobile terminal to function as:
a unit that acquires external information indicating an environment in which the paired ball moves independently;
a unit that generates ball movement data of the paired ball in which the sensor data of the paired ball obtained via the first communication unit and the second communication unit is associated with the external information; and
a unit that stores the ball movement data via the Internet in a cloud server;
wherein the external information includes a pitching distance, a pitching direction, and position information,
and the program comprises instructions that cause the mobile terminal to function as:
a unit that outputs a pitching speed based on acceleration information obtained from the sensor data and the pitching distance;

a unit that outputs a rotational speed of the ball based on geomagnetic information obtained from the sensor data; and a unit that calculates, from the geomagnetic information and a geomagnetic inclination angle obtained from the position information, an angle of an axis of rotation with respect to a horizontal plane and outputs a type of pitch determined based on the pitching speed, the rotational speed, and the angle of the axis of rotation that has been converted to an angle with respect to a direction of travel of the ball according to the pitching direction.

10. The program product according to claim 9, further comprising an instruction that causes the mobile terminal to function as a simulator that displays, based on the ball movement data, a state of the ball during movement when viewed from outside.

\* \* \* \* \*